Figure 1:
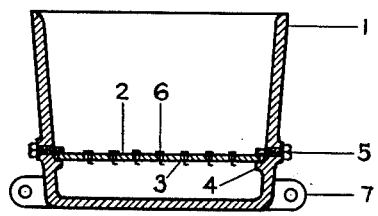

June 30, 1953     L. A. EDWARDS     2,643,485

PRODUCTION OF LIGHTWEIGHT AGGREGATE FROM MOLTEN SLAG

Filed April 26, 1951

Lee A. Edwards INVENTOR.

BY Bentley G. Morrow
Attorney

Patented June 30, 1953

2,643,485

UNITED STATES PATENT OFFICE 2,643,485

PRODUCTION OF LIGHTWEIGHT AGGREGATE FROM MOLTEN SLAG

Lee A. Edwards, Sheffield, Ala., assignor to Tennessee Valley Authority, a corporation of the United States Application April 26, 1951, Serial No. 223,130

2 Claims. (Cl. 49—14)

(Granted under Title 35, U. S. Code (1952), sec. 266)

The invention herein described may be manufactured and used by or for the Government for governmental purposes without payment to me of any royalty thereon.

This invention relates to improved apparatus for producing expanded or foamed slag. It relates particularly to improved apparatus for introducing steam into molten slag contained in a receptacle.

Giller, in United States Patent 1,483,716, has described a method and apparatus for expanding molten slag. His apparatus comprises a series of receptacles into each of which is introduced successively a quantity of water and a quantity of molten slag. The hot slag converts the water into steam, which in turn expands the slag into a frothy, porous material. After a short interval the expanded slag is discharged from these receptacles.

There are several disadvantages inherent in the operation of apparatus and methods in which molten slag is introduced into a receptacle containing a layer of water. Initially, the volume of such molten slag is small as compared to the volume of water; thus, rather than being expanded, the first quantity of slag so introduced is often quenched and granulated. Later, as larger quantities of slag cover the layer of water, the slag is frothed by the action of steam formed, but the product discharged from the receptacle is not uniform in structure, density, or in strength. Such lack of uniformity detracts from the value of the product formed.

It is an object of this invention to provide an apparatus for uniformly expanding molten slag in a receptacle which utilizes heat from the molten slag for converting water into steam and which distributes and introduces the resulting steam into the molten slag in a uniform manner.

Another object is to provide such apparatus in which the means for distributing and introducing steam and cannot be blocked by small quantities of hardened slag.

Another object is to provide an apparatus having the particular advantageous arrangement of parts shown and described.

Other advantages will become apparent as this disclosure proceeds.

I have found that such apparatus may be formed by providing a receptacle or, preferably, a chain of water-tight receptacles, each having a false bottom having a plurality of openings therethrough; a plurality of loose-fitting plugs singly disposed through each of said openings, each of said plugs comprising a loose-fitting head large enough to cover one of said openings, a shank portion having effective length slightly greater than the thickness of said false bottom, and a retaining member attached to or integral with said shank beneath the false bottom; means for introducing water into said receptacle beneath said false bottom; and means for subsequently introducing molten slag into said receptacle above said false bottom.

Figure 2:
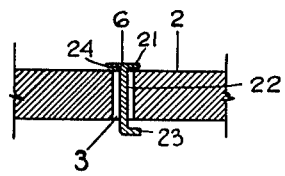

In the attached drawings Figure 1 is a sectional view of one type of such receptacle; Figure 2 is an enlarged detail of a short section of the false bottom illustrated in Figure 1, showing the relationship of one loose-fitting plug to an opening through the false bottom; and Figure 3 shows one preferred type of construction in which a series of such receptacles is arranged for use in a continuous process.

In Figure 1 the reference numeral 1 indicates a water-tight receptacle which may be made in any suitable size and shape. A false bottom 2 is disposed therein, supported upon shoulder 4 and held in place by bolts 5. A plurality of openings 3 through the false bottom are disposed substantially uniformly over the area thereof. A plurality of loose-fitting plugs 6 are singly disposed through each of openings 3. Each of plugs 6 comprises a loose-fitting head portion 21 large enough to cover opening 3, a shank portion 22 having effective length slightly greater than the thickness of false bottom 2, and a retaining member 23 below the false bottom, as is shown most clearly in the enlarged detail Figure 2. The head of plug 6, although large enough to cover opening 3, should be sufficiently loose-fitting upon the surface of false bottom 2 to permit water to flow easily beneath it. Such loose fit is readily obtained by providing an irregular surface 24 upon the bottom of these heads or by curving the heads slightly. Plugs 6 may conveniently be made from common nails of suitable size inserted through openings 3 and having their shanks bent to form an integral retaining member beneath false bottom 2. Suitable links 7 are preferably attached to or formed integrally with receptacle 1 in position to cooperate with corresponding links of adjacent receptacles to form a chain of receptacles.

Figure 3:
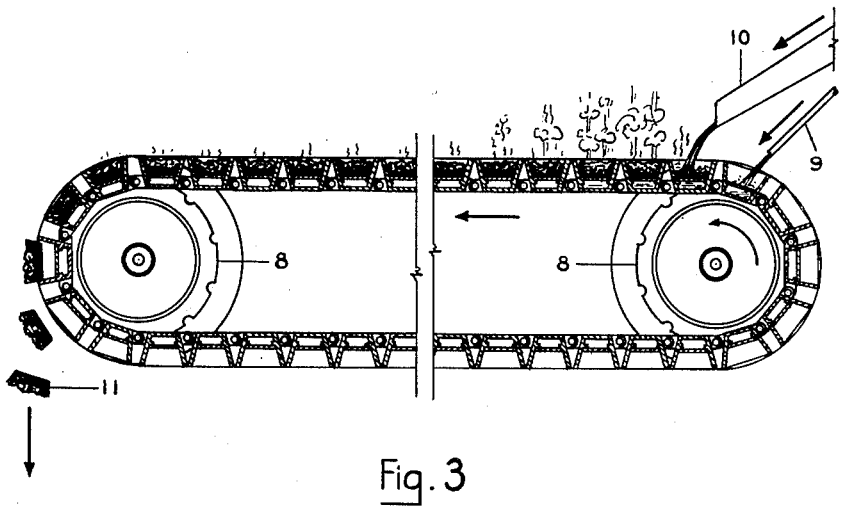

Figure 3 shows a number of such receptacles joined together to form an endless chain disposed upon rotatably mounted sprocket wheels 8, at least one of which is driven in any suitable manner from any convenient source of power (not shown). A water inlet 9 is disposed to introduce a controlled quantity of water into each receptacle as it is turned into upright position by rotation of sprockets 8. Inlet 9, the loose-fitting heads of plugs 6, and openings 3 cooperate to form a means for introducing water into that part of each receptacle below false bottom 2. A means for introducing molten slag into each receptacle, which is preferably a slag trough 10, is disposed subsequent to water inlet 9 in the direction of travel of the chain.

In operation sprockets 8 are set in motion and each receptacle passes under water inlet 9. This inlet is of such predetermined size or properly valved so that the amount of water introduced into each receptacle is sufficient to fill the chamber below false bottom 2 and to just cover the false bottom. The water introduced runs into the lower chamber because of the loose fit of the heads of plugs 6 upon the upper surface of the false bottom.

Each receptacle then passes in turn beneath slag trough 10 and receives therefrom a quantity of molten slag sufficient to substantially fill that part of the receptacle above false bottom 2 when fully expanded. Heat from the slag vaporizes the water below false bottom 2 and steam pressure builds up in the lower chamber. Resulting steam pressure lifts plugs 6 with the result of emitting puffs of steam into the body of molten slag. I have found that so long as steam is being rapidly generated in the lower chamber a violent, rapid, vertical reciprocal motion is imparted to plugs 6, somewhat analogous to the action of the plunger of an air hammer. The introduction of a great number of small puffs of steam from openings evenly distributed beneath the body of slag effectively expands the slag into a uniform foam-like state. The motion of plugs 6 also effectively prevents obstruction of openings 3 by small quantities of hardened slag.

The chain of receptacles is made long enough that the expanded slag is retained in each receptacle until it has hardened, or at least until a crust has formed on the top, bottom, and sides of the mass. As each receptacle is turned in passing over the second sprocket 8 the resulting mass of cooled expanded slag 11 drops out of the receptacle into any suitable receiving space.

The height at which the perforated false bottom is placed above the bottom of the receptacle depends upon the depth of the receptacle. For most effective results the amount of water added to each receptacle should be slightly greater than the amount that can be evaporated by the molten slag. In tests of my apparatus, in which slag produced in electric-furnace smelting of phosphate rock was used, it was found that a lower chamber filled with water having a depth of about 2½ inches was appropriate for expanding the slag to a depth of 15 inches. In general, satisfactory results may be obtained by spacing the perforated false bottom from the bottom of the receptacle a distance equal to about one-eighth to one-sixth of the depth of the receptacle.

Apparatus as described above will ordinarily be more efficient and convenient in operation for most commercial uses than its batch-type equivalent. The latter may be used in some particular applications if desired. All that is necessary is to provide a receptacle equipped with a false bottom, openings, and plugs as described above, any suitable means for filling its lower chamber with water, and means for subsequently introducing slag above the false bottom.

I claim as my invention:

1. In a device for expanding slag the combination of a water-tight receptacle; a false bottom having a plurality of openings therethrough disposed in said receptacle; a plurality of loose-fitting plugs singly disposed through each of said openings, each of said plugs comprising a loose-fitting head large enough to cover one of said openings, a shank having effective length slightly greater than the thickness of said false bottom, and a retaining member attached to said shank beneath the false bottom; means for introducing water into said receptacle; and means for introducing molten slag into said receptacle above said false bottom.

2. In a device for expanding slag the combination of a water-tight receptacle; a false bottom having a plurality of openings therethrough disposed in said receptacle; a plurality of nails singly disposed through each of said openings, each of said nails having a head large enough to cover one of said openings disposed above said false bottom and having its shank bent into retaining relationship a short distance beneath said false bottom; means for introducing water into said receptacle; and means for introducing molten slag into said receptacle above said false bottom.

LEE A. EDWARDS.

References Cited in the file of this patent

UNITED STATES PATENTS

| Number | Name | Date |
|---|---|---|
| 1,453,735 | Twining | May 1, 1923 |
| 1,843,716 | Giller | Feb. 2, 1932 |
| 2,061,830 | Campbell | Nov. 24, 1936 |
| 2,428,249 | Stuart et al. | Sept. 30, 1947 |